United States Patent
Nehmer et al.

(10) Patent No.: US 8,101,746 B2
(45) Date of Patent: *Jan. 24, 2012

(54) GRANULAR SUCRALOSE, AND METHOD OF MAKING IT

(75) Inventors: Warren L. Nehmer, Decatur, IL (US);
Roy O. Elmore, Atwood, IL (US);
William R. Skelding, Saraland, AL (US); Alexandria L. Bailey, Champaign, IL (US)

(73) Assignee: Tate & Lyle Technology Limited, London (GB)

( * ) Notice: Subject to any disclaimer, the term of this patent is extended or adjusted under 35 U.S.C. 154(b) by 814 days.

This patent is subject to a terminal disclaimer.

(21) Appl. No.: 11/886,494

(22) PCT Filed: Mar. 20, 2006

(86) PCT No.: PCT/US2006/009971
§ 371 (c)(1),
(2), (4) Date: Jul. 24, 2008

(87) PCT Pub. No.: WO2006/102208
PCT Pub. Date: Sep. 28, 2006

(65) Prior Publication Data
US 2008/0311278 A1 Dec. 18, 2008

(51) Int. Cl.
*C13K 13/00* (2006.01)
*C07H 5/02* (2006.01)
*C07H 1/00* (2006.01)

(52) U.S. Cl. .................. 536/123.13; 536/122; 536/4.1; 536/124

(58) Field of Classification Search .............. 536/123.13, 536/122, 4.1, 124
See application file for complete search history.

(56) References Cited

U.S. PATENT DOCUMENTS

| | | | |
|---|---|---|---|
| 4,588,612 A | 5/1986 | Perkins et al. |
| 4,863,745 A | 9/1989 | Zibell |
| 5,061,320 A | 10/1991 | Goodacre et al. |
| 5,139,798 A | 8/1992 | Yatka et al. |
| 5,384,311 A | 1/1995 | Antenucci et al. |
| 5,498,709 A | 3/1996 | Navia et al. |
| 5,932,720 A | 8/1999 | Sankey et al. |
| 6,180,157 B1 | 1/2001 | Fotos et al. |
| 6,258,381 B1 | 7/2001 | Luber et al. |
| 6,423,358 B1 | 7/2002 | Barndt et al. |
| 6,461,658 B1 | 10/2002 | Merkel et al. |
| 6,646,121 B2 | 11/2003 | El Kabbani et al. |
| 6,673,380 B2 | 1/2004 | Yang et al. |
| 2002/0122823 A1 | 9/2002 | Bunick et al. |
| 2003/0059519 A1 | 3/2003 | Merkel et al. |
| 2004/0220398 A1 | 11/2004 | Catani et al. |
| 2004/0258822 A1 | 12/2004 | Liao et al. |
| 2005/0203290 A1 | 9/2005 | Catani et al. |
| 2005/0214425 A1 | 9/2005 | Vazirani |
| 2006/0068058 A1 * | 3/2006 | Boghani et al. ................. 426/5 |
| 2006/0289536 A1 | 12/2006 | Vinegar |
| 2007/0164187 A1 | 7/2007 | Frey |

FOREIGN PATENT DOCUMENTS

| | | |
|---|---|---|
| CN | 101056546 | 10/2007 |
| EP | 0646326 | 4/1995 |
| JP | 08056605 | 3/1996 |
| JP | 2000 037169 | 2/2000 |
| JP | 2007504984 | 3/2007 |
| JP | 2007534864 | 11/2007 |
| WO | WO 92/10168 | 6/1992 |
| WO | WO 92/18017 | 10/1992 |
| WO | WO 97/41835 | 11/1997 |
| WO | 2004096821 A1 | 11/2004 |
| WO | WO 2006/039650 | 4/2006 |

OTHER PUBLICATIONS

Gorka, Horvai; "Singapore Search and Examination Report"; Nov. 20, 2009; 5 pp; Intellectual Property Office of Singapore, Singapore.
"Applications," 3 pp.; Jun. 18, 2004; Fitzpatrick; http://www.fitzmill.com/food/dry_granulation/applications/applications_dg.html.
"Chilsonated Roller Press System," 3 pp.; Jun. 18, 2004; Separator Engineering Ltd.; Scarborough, Ontario, Canada; http://www.process-controls.com/Separator/Fitzmill_Chilsonator.htm.
"Food Process Equipment from Fitzpatrick Company," 4 pp.; Jun. 18, 2004; Separator Engineering Ltd.; http://www.separatorengineering.com/Fitzmill_Food.htm.
Couzy, Francois; "International Preliminary Report on Patentability"; Nov. 11, 2009; 2pp; European Patent Office, Munich, Germany.
Australian Examination Report issued on Sep. 8, 2010, in related Application No. 2006227314.
Chinese Office Action mailed on Feb. 10, 2011, in related Application No. 200680008664.6 (English translation only).
European Examination Report issued on Nov. 11, 2009, in related Application No. 06 738 949.4.
Japanese Official Letter mailed Jul. 14, 2010, in related Application No. 2008-502136. Singapore Search and Examination Reports issued Nov. 19, 2009, in related Application No. 200706619-4.

* cited by examiner

*Primary Examiner* — Shaojia Anna Jiang
*Assistant Examiner* — Michael C Henry
(74) *Attorney, Agent, or Firm* — RatnerPrestia

(57) ABSTRACT

Granular sucralose-containing particles are produced by the methods of the invention, which involve coating sucralose from solution to form granules with this coated sucralose on an outer region thereof. The granules may incorporate agglomerated sucralose particles, with the solution-coated sucralose adding mass and generally resulting in a granule having a relatively smoothed and rounded. The granules have good flow properties, are low dusting, and resist caking. Methods of making the granules involve spraying an aqueous sucralose solution onto a fluidized bed of sucralose particles, followed by drying to form the granules.

33 Claims, 5 Drawing Sheets

GRANULAR SUCRALOSE, AND METHOD OF MAKING IT

CROSS REFERENCE TO RELATED APPLICATIONS

This application is the National Stage filing of PCT application US2006/009971, filed Mar. 20, 2006, and claims priority of U.S. patent application Ser. No. 11/084,444, filed Mar. 18, 2005, the entire disclosure of which is expressly incorporated herein by reference.

BACKGROUND OF THE INVENTION

High-intensity sweeteners can provide the sweetness of sugar, with various taste qualities. Because they are many times sweeter than sugar, however, much less of the sweetener is required to replace the sugar. High-intensity sweeteners have a wide range of chemically distinct structures and hence possess varying properties.

In order for a high-intensity sweetener to be conveniently used for dry blending and tableting, several criteria should be met. These include good flow properties, little dust formation during processing, absence of static electric problems, and good mechanical strength.

Sucralose (1,6-dichloro-1,6-dideoxy-β-D-fructofuranosyl-4-chloro-4-deoxy-α-D-galactopyranoside) is a high-intensity sweetener made by the selective chlorination of sucrose. Sucralose is a white, crystalline, nonhygroscopic powder in its pure form. It is highly soluble in water, ethanol, and methanol and has a negligible effect on the pH of solutions. Sucralose is frequently sold in the form of needle-like crystals resulting from the final purification of the product after synthesis, or in the form of "micronized" product produced by milling the crystalline form.

Commercially available sucralose in either of these forms, by virtue of being a particulate solid, may be subject to some of the inconveniences commonly encountered in handling any particulate material, including flow and dusting issues. Thus, advances in these areas would be of value in commercial applications.

SUMMARY OF THE INVENTION

In one aspect, the invention provides granules comprising sucralose, each of said granules having an outer surface region thereof comprising solution-coated sucralose.

In another aspect, the invention provides a method of preparing granules comprising sucralose. The method includes:

a) fluidizing starting particles comprising sucralose and having a $d_{50}$ value between 5 and 200 μm on a fluidized bed; and b) applying to the starting particles an aqueous particle growth mixture comprising dissolved sucralose to produce wet particles comprising solid sucralose with a layer of aqueous sucralose thereon, while simultaneously drying the wet particles.

Steps a) and b) are repeated as required such that between 5 and 100% of a total weight of sucralose in the granules is provided by the aqueous particle growth mixture.

DETAILED DESCRIPTION OF THE INVENTION

Figure 1A:
FIGS. 1a and 1b are photomicrographs of prior art sucralose crystals.

The present invention discloses sucralose-containing granules, and processes for making such granules. The term "granules" as used herein means particles that have been formed by a solution coating process. In this process, a sucralose solution is coated onto smaller particles and the solvent is evaporated to provide an outer surface region containing the sucralose. This process typically results in granules having a surface that is smoother and rounder than that provided when sucralose is recrystallized for purposes of purification, such as during the production of neat sucralose. Agglomeration of smaller particles may also occur, with the solution-coated sucralose binding them together. The granules typically have good flow properties, low dusting tendency, good mechanical strength, little tendency to generate static electric charge, and acceptable storage stability. The granules typically contain (other than incorporated moisture) at least 90 wt % sucralose, more typically at least 98 wt %, and most typically at least 99.9 wt %.

Sucralose granules according to the invention may be of any size. Typically they will have a $d_{50}$ between 100 and 1000 μm in size, as determined by screening, where $d_{50}$ is the median granule size. More typically, the granules are within a more tightly controlled specific range whose limits depend upon the particular application for which the sucralose is intended. Granules having a $d_{50}$ of 100-300 μm may be particularly useful for dry mix applications, while those with a $d_{50}$ of 300-1000 μm may be more suitable for tableting applications. In one embodiment of the invention, the granules have a $d_{50}$ between 400 and 800 μm in size, and are especially useful in tableting applications. Sucralose granules according to the invention are typically such that at least 99 wt % of them cannot pass through a 25-μm screen. The applicants have found that product meeting this requirement produces very little dust during handling.

Granulated sucralose made according to the invention is typically of a relatively narrow particle size distribution, consisting largely of relatively large particles and very little fines or dust, with the particles having a relatively low length to diameter (L/D) ratio. The portion of the granules of size greater than 25 μm generally have an L/D ratio of less than 2.0, typically less than 1.70, and more typically less than 1.50 on a number average basis, as indicted by inspection under an optical microscope. As used herein, the granule length is taken as the length of the longest dimension of the granule, and the diameter is the greatest width measurable at right angles to the longest dimension as viewed under the microscope. At least partially as a result of the size and shape characteristics of the granules of this invention, the product tends to be very free-flowing, usually better in this regard than typical crystalline sucralose or micronized sucralose, which additionally have the problem of tending to cake during storage.

The granulated sucralose particles of this invention tend to be round or bead-like in shape and, as such, tend to minimize the dusting and clumping problems associated with conventional micronized product. The sucralose compositions of this invention typically exhibit excellent flow properties.

Typically, the granules of this invention have a bulk density between 400 and 900 g/L, more typically between 600 and 850 g/L. Typically, sucralose granules according to the invention have a moisture content between 0.05 and 1.0 wt %, more typically between 0.1 and 0.5 wt %. One notable characteristic of the is granules is that, even at moisture contents as high as 0.5% wt %, they resist caking during storage and exhibit good flow properties. For example, typical sucralose granules of this invention have an angle of repose between 20° and 50°, more typically between 25° and 35°, indicating very good flow characteristics, when measured by the method used by Sankey, U.S. Pat. No. 5,932,720. Similarly, high Flow Rate Index numbers are typically obtained with the sucralose granules of this invention, as detailed below in the Examples section. The coefficient of variation of the granule size of the inventive sucralose granules is typically less than 35%, indicating that the particles are of relatively uniform size. For purposes of this invention, coefficient of variation is as defined in the above-mentioned Sankey patent. A low coefficient of variation may help provide good flow properties. It will be appreciated by those of ordinary skill in the art that good flow properties and resistance to caking are of major advantage in handling any dry material, such as solid sucralose.

The granules produced by the methods of the invention may be essentially solid, by which it is meant that they have few or no hollows or voids in them. Such particles tend to form when a significant amount of the sucralose mass in the particle is provided by particle growth mixture containing dissolved sucralose, as will be described in detail below. Alternatively, the particles may have a rather open structure representing what appears to be an assembly of smaller particles bonded together at the contact points by sucralose from the growth mixture. Such particles tend to form when the amount of sucralose added from the growth mixture is relatively small, so that the sucralose produces bridges between the smaller particles but does not fill in all of the interstitial spaces between them. Particles with such an open structure are generally of lower bulk density than those that are essentially solid. In either case, the mechanical strength of the product has been found to be very good, as evidenced by the relative absence of dust due to particle breakage. Mechanical strength of a particle is meant to describe the ability of the particle to retain its form while it is mixed and handled, for example in a packaging process. A particularly desirable feature for a high-intensity sweetener such as sucralose is the ability to retain good mixing and handling capabilities so as to avoid breaking apart and losing its form and effectiveness. The granular sucralose of the invention has good mechanical strength, one beneficial result of which is that there is relatively little breakage and consequent formation of fines during handling, the presence of which can cause uneven sucralose distribution in formulations containing the product.

Due to the high solubility of sucralose in water, even large granules dissolve rapidly with mild stirring at room temperature, and those with the relatively open structure described above tend to dissolve even more rapidly than solid particles of the same size. This property is important to many manufacturers of both dry powder mixes as well as liquid applications. For example, the carbonated soft drink industry currently packages dry agglomerated aspartame, another high-intensity sweetener, in high-speed form-fill-seal packaging lines for use in diet soft drink manufacture. Larger particles allow the product to be packaged at higher line speeds, but larger particles are more difficult for the end user to dissolve, and thus the poor dissolution properties of aspartame limit its maximum particle size to around 400 µm, thus limiting packaging line speed. Larger, rapidly dissolving particles of sweetener may therefore offer a significant operational benefit to primary purchasers of sucralose. In some embodiments of the invention, the sucralose-containing granules have a $d_{50}$ value between 800 and 2000 µm, and are especially suitable for packaging. In other embodiments, particles having a $d_{50}$ value between 100 and 300 µm, or between 400 and 800 µm, are preferable for certain applications. All of these may be prepared by the methods of this invention.

Sucralose

Sucralose suitable for use in making the granulated product of this invention may be obtained by any means known in the chemical art, and is not restricted to any particular synthesis method. Exemplary procedures are set forth in U.S. Pat. Nos. 4,362,869; 4,380,476; 4,801,700; 4,950,746; 5,470,969; and 5,498,709. In all of these procedures, a final step in the synthesis of sucralose requires a deacylation followed by a crystallization of the sucralose. Typically, after completion of deacylation, the resulting crude sucralose is worked up with a preliminary purification and then crystallized. The crystals that are formed are separated from the mother liquor by centrifugation to form a "wet cake", which typically has a moisture content of about 3-5 wt %. The wet cake is typically then dried to a moisture content less than about 0.1 wt %. The resulting product, referred to herein as "neat" sucralose, has a needle-shaped or otherwise elongated crystalline form, such as seen in FIG. 1, often with significant amounts of fine particulate matter due to breakage of the crystals.

Granulation of Sucralose

Granulated sucralose according to some embodiments of the invention may be produced by fluidizing a charge of starting sucralose particles, for example neat sucralose or micronized sucralose, on a fluid bed agglomerator such as a GPCG-60 unit (available from Glatt Air Techniques, Inc. of Ramsey, N.J.), and spraying an aqueous solution of sucralose, referred to herein as a "particle growth mixture," on the fluid bed to agglomerate and/or coat the sucralose particles while adding sucralose mass to them. Thus, by applying to the starting particles an aqueous sucralose solution and then drying the particles, this embodiment of the invention differs from processes in which crystal reshaping or redefinition is the main mode of action, and also differs from those in which agglomeration may occur but without addition of sucralose mass. The solids component of the growth mixture typically contains at least 90 wt % sucralose, more typically at least 98 wt %, and most typically at least 99.9 wt %. Typically, the only ingredients of the growth mixture are water and sucralose.

The amount of this aqueous particle growth mixture may be varied to change the bulk density and average particle size of the granular product. For example, increasing the amount and/or concentration of the particle growth mixture applied to the starting particles tends to give a higher bulk density and a larger average particle. In general, temperatures should be kept low to protect the sucralose from chemical degradation. The GPCG-60 fluid bed unit may be operated in normal fluid bed agglomeration and/or coating mode (top spray or bottom spray) or in Wurster coating mode.

Typically, the particle growth mixture will contain a concentration of between 0.1 and 65 wt % of dissolved sucralose, more typically between 5 and 65 wt %, and most typically between 20 and 55 wt %. In some embodiments, a solution of about 25 wt % of sucralose in water is used. In other embodiments, an approximately 50% sucralose solution, heated to about 140° F. (60° C.) to keep the sucralose dissolved, may also be used to agglomerate and/or coat neat sucralose. Use of such high concentrations may be beneficial in that they reduce the amount of water that must be removed in order to provide dry product. The 50% sucralose solution may also rapidly produce crystalline sucralose as it cools on the surface of the sprayed particles. In some embodiments of the invention, essentially all of the sucralose in the syrup is dissolved. In other embodiments, a combination of dissolved and undissolved sucralose may be used.

In some embodiments of the invention, the aqueous particle growth mixture may comprise a buffer and have a pH in a range of 4.0 to 7.0. In some embodiments, the pH is in a range of 4.2 to 5.0, and typically the range will be 4.2 to 4.6. If present, the buffer will usually comprise combination of a weak acid and a salt of a weak acid, most commonly (but not necessarily) the salt of the same weak acid. Combinations of weak acids and/or combinations of salts of weak acids, rather than single weak acids or salts, may also be used. In some embodiments of the invention, the aqueous particle growth mixture comprises from 0.05 to 2.0 wt % of a combination of a weak acid a salt of a weak acid. Typically, from 0.1 to 1.0 wt % of such a combination will be used. Any buffer known in the art may be employed. Suitable exemplary buffer systems include citric acid and sodium citrate or potassium citrate; phosphoric acid and sodium phosphate or potassium phosphate; amino acid bases and their acids such as arginine and arginine HCl, lysine and lysine HCl; tartaric acid and sodium tartrate or potassium tartrate; adipic acid and sodium adipate or potassium adipate; malic acid and sodium malate or potassium malate; sodium phosphate monobasic and sodium phosphate dibasic; and the like.

The granulation process may be either batch or continuous, and various types of commercially available equipment may be used to prepare the product. These include, as nonlimiting examples, Littleford mixers and pan agglomerators. In some embodiments, a continuous moving bed fluidizer is used, an exemplary model being the Glatt model GFG 20. It has been found that if high temperatures occur in the granulation process, the storage stability of the product tends to be compromised, and therefore the granulation process is typically run at a temperature between 15 and 40° C.

In one embodiment of the invention, the method involves fluidizing starting particles comprising sucralose and having a $d_{50}$ value between 5 and 200 μm on a fluidized bed, and applying to the starting particles an aqueous particle growth mixture. More typically, the starting particles will have a $d_{50}$ value between 5 and 100 μm. The mixture contains dissolved sucralose, and typically essentially all of the sucralose in the mixture is in fact dissolved. However, the mixture may optionally also contain undissolved sucralose. The mixture wets the starting particles, and the wetted particles are simultaneously dried by an upward current of air (or other gas) flowing in a volume sufficient to fluidize the mass. This results in deposition of solid sucralose onto the particles as the particle growth mixture dries. It will be appreciated that the application of the particle growth mixture, which is typically performed by spraying, occurs while drying takes place, and therefore the particles may become wetted and dried numerous times during the process, which may be a batch, continuous, or semi-batch process. Some or all of the particles may dry only partially before they are coated with more particle growth mixture, or some or all of them may dry to the point of being liquid-free during the process. Regardless, the particle size builds up. The increase in particle size may be partially due to agglomeration of the starting particles, but the inventors have found that mere agglomeration (such as might be obtained by spraying only with water, as opposed to an aqueous mixture containing sucralose) does not give both the low L/D ratio and the low angle of repose and low coefficient of variation provided by the invention. Rather, an important aspect of the methods of this invention is that they involve application of a sucralose solution to the particles, and deposition of sucralose from that solution to grow the particles.

Figure 5A:
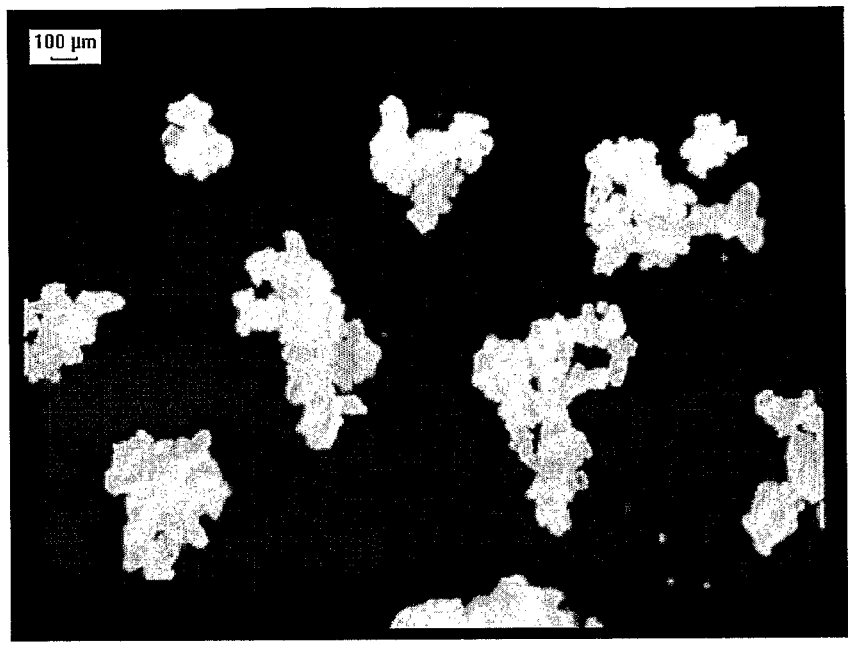
FIGS. 5a and 5b are photomicrographs of yet further examples of sucralose granules of this invention.
Figure 5B:
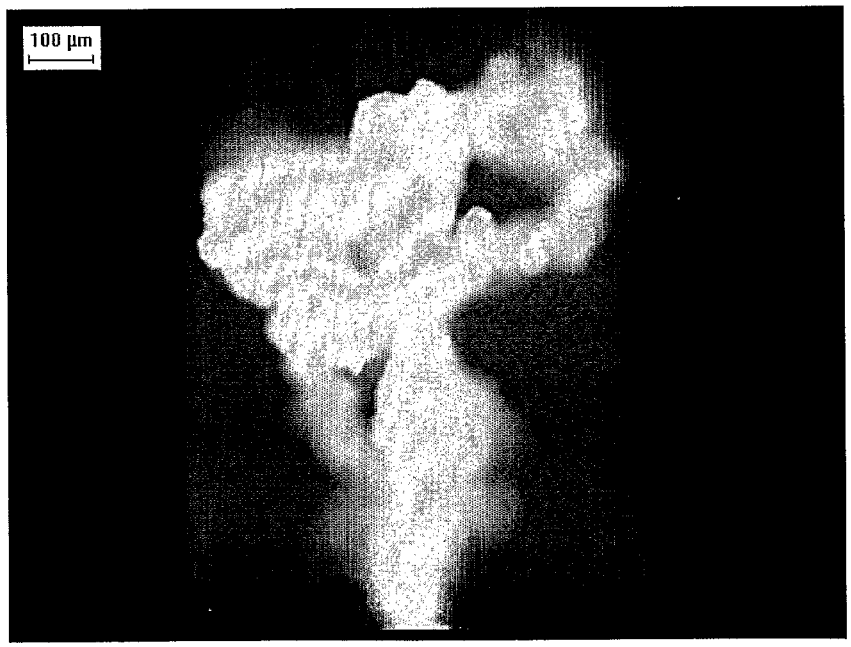

Without wishing to be bound by any particular theory or explanation, the inventors currently believe that sucralose from this mixture crystallizes rapidly upon application to the surface of the particles under the drying conditions of a fluidized bed, and that the sucralose thereby laid down on any agglomerates that may be present acts to fill in gaps and holes in the agglomerate. The agglomeration process may be run so that agglomeration occurs early in the process, followed by coating of the agglomerate. Whatever the mechanism, the result is that there is very little dusting in the product, perhaps due to increased mechanical integrity in the granules. Thus, typically between 5 and 100% of the total weight of sucralose in the granules is provided by the aqueous particle growth mixture, with the remainder being provided by the starting sucralose particles. The proportion of sucralose so provided is typically between 25 and 50 wt % for agglomerated sucralose, and between 25 and 100% for spray granulated sucralose. It will be appreciated by the person of skill in the art that the distinction between agglomeration and coating is somewhat arbitrary when both involve the addition of sucralose from solution, with subsequent drying to form the particles. At the start, the granules may each comprise a plurality of starting sucralose particles agglomerated together and having on their surface a layer of deposited sucralose, wherein the layer of deposited sucralose bridges the starting sucralose particles to adhere them together, thereby forming the granules. This structure may be rather porous, and may be collected as the final product. Such a product will have a relatively low density. One example of such a product is shown in FIGS. 5a and 5b.

At some point, if more growth mixture continues to be added, sucralose from solution fills in the interstices to a significant extent and begins to cover the outside of the agglomerate, and the particle begins to closely resemble one that has been grown solely by coating a single small, solid particle. The proportion of sucralose in the granular product that is contributed by the growth mixture can be varied by varying the size of the starting particles and the amount and/or concentration of the particle growth mixture added. Larger amounts and/or concentrations of particle growth mixture result in increasing percentages of sucralose in the granules being contributed by this source.

The starting particles may be of any size and shape, and may be fed to a batch process. Such a method may produce either agglomerated particles with interstitial openings, or essentially solid particles. Alternatively, the starting particles may be fed to a continuous process throughout its operation, or only at the beginning. In the latter embodiment, once the system has been running for a period of time, all of the sucralose granules exiting the process will contain only sucralose that originated from the particle growth mixture, without any component of sucralose that was fed as a solid to the fluidized bed. Thus, in some embodiments of the invention, the sucralose in the granules is at least 90 wt % derived from the particle growth mixture, and typically the figure is 99-100 wt %.

EXAMPLES

General Procedures

Particle size measurements were determined using an oscillating particle size table. The oscillations were set at 20-second intervals for 3 minutes with an amplitude of 75. Different screen sizes were chosen based on the desired particle size of the product. The screens were placed on a pan to collect the fines. The top of the particle size table was fastened on to the screen stack and the oscillations were started. After 3 minutes, the screens were removed and weighed to determine percent of product on designated screen. The results were then recorded as a percentage of total weight loaded on to screens.

Moisture determination was performed on a Sartorius moisture balance. First, the weigh pan was tared and approximately 2 grams of material was spread evenly over the balance pan. The sample was then heated up to a temperature of 80° C. After 10 minutes, the loss on drying was determined and the percent moisture based on initial weight was displayed. The results were recorded as percent of as-is sample.

Loose bulk density measurements were performed using a typical funnel and cup method, such as is well known in the art. The sample cup was tared, and the sucralose sample was added to the hopper until it was full. The tared sample cup was placed under the hopper and the hopper was unloaded into the sample cup. Using a long blade scraper, the excess sample was scraped off the top of the sample cup. Care was taken not to shake or tap the sample cup so that there was minimal packing. The full sample cup was then weighed to determine the loose bulk density of the product. The results were recorded as grams per cubic centimeter.

A 20-gram portion of each sample of granular sucralose was placed in an 8-oz bottle and sealed for testing. Also, five 4-oz Whirl-Pak® bags (available from Nasco of Modesto, Calif.) were labeled for each sample and filled with 25 grams of neat product. Each of the five filled 4-oz Whirl-Pak bags for each sample was then sealed and placed into a separate 16-oz Whirl-Pak bag. The 16-oz bags were then sealed. Once all bags were prepared they were hung in a convection oven set at 50° C.

The samples were then monitored over a five-day period for changes in pH and appearance. On day zero, the contents of each 8-oz bottle were tested for these parameters and the results recorded. At 24 hours, and for each 24-hour period thereafter for the next 5 days, one bag from each sample was removed from the 50° C. oven and allowed to cool for 2 hours. At the end of the 2-hour period, the samples were moved into an 8-oz wide-mouth bottle and sealed. Each of these sample was then dissolved to a 10 wt % concentration in water that had been adjusted to have a pH between 5.8 and 6.2. The pH of the resulting solution was measured, with a drop in pH greater than 1.0 pH unit indicating failure of the stability test.

The flow properties of selected samples were investigated using Johanson Indicizers, available from Johanson Innovations of San Luis Obispo, Calif.

Example 1

Spray granulation of sucralose was performed according to the invention on a Glatt GFG-20 pilot scale continuous fluid bed unit, available from Glatt Air Techniques, Inc. of Ramsey, N.J. The unit was equipped with an internal filter system. An electric heater and a primary air valve system were used for inlet air conditioning of the four fluid bed sections. The filter cartridges were cleaned by compressed air pressure shocks. The equilibrium of feed and product output was controlled by an rotary valve at the end of the discharge device. The liquid formulation was atomized by compressed air using two fluid nozzles. The metering of the spraying liquid of the three separate nozzles was realized using three peristaltic pumps. The run was started with about 20 kg of starting material, which consisted of neat sucralose and/or granular product from earlier runs. After a short period of batch processing, the spraying of aqueous growth mixture and the continuous output of product were started, without the addition of any solid sucralose. The spray solution consisted of an aqueous solution comprising 25% by weight dissolved sucralose, maintained at about 25° C., sprayed from the bottom using a steel air cap. The spray rate was between 20 and 24 kg/h, using an atomization air pressure of 2.3-1.5 bar at an atomization air temperature of 20° C. The results are given in Table 1, where the Time is time of day and the moisture content is of the product exiting the end of the continuous unit. Note the change in sieving conditions between the first and second parts of the table, made necessary by the increase in granule size as the run continued.

TABLE 1

| Time | 9:45 | 10:45 | 11:30 | 13:00 | 13:55 | 15:00U |
|---|---|---|---|---|---|---|
| Moisture Content (%) | 0.38 | 0.16 | 0.16 | 0.15 | 0.19 | 0.26 |
| Loose Bulk Density (g/L) | 844 | 845 | 850 | 824 | 818 | 835 |
| On 400 µm screen (%) | 0.1 | 0.1 | 0.1 | 1.1 | 3.4 | 16.7 |
| On 315 µm screen (%) | 0.7 | 0.4 | 0.7 | 4.4 | 11.3 | 21.2 |
| On 250 µm screen (%) | 2 | 2.2 | 2.8 | 11.4 | 19.4 | 32.8 |
| On 200 µm screen (%) | 10.4 | 12.8 | 14.1 | 25.7 | 36.2 | 22 |
| On 160 µm screen (%) | 24.3 | 38.7 | 35 | 34.9 | 20 | 4.2 |
| On 100 µm screen (%) | 43.3 | 35.6 | 32.2 | 17.8 | 7.9 | 2 |
| On 63 µm screen (%) | 16.9 | 10.2 | 14.2 | 3.7 | 2 | 1.1 |
| Thru 63 µm screen (%) | 1.2 | 0.2 | 0.9 | 0.6 | 0.3 | 0.1 |

| Time | 15:00S | 16:00 | 17:00 | 17:50S | 17:50U |
|---|---|---|---|---|---|
| Moisture Content (%) | 0.19 | 0.28 | 0.16 | 0.2 | 0.36 |
| Loose Bulk Density (g/L) | 847 | 841 | 851 | 854 | 858 |
| On 630 µm screen (%) | 6.7 | 14.9 | 16.5 | 21.7 | 30.2 |
| On 500 µm screen (%) | 16.5 | 29.6 | 48 | 53 | 46.8 |
| On 400 µm screen (%) | 28.9 | 45.4 | 29.6 | 18.7 | 16.6 |
| On 315 µm screen (%) | 29.7 | 9 | 5.4 | 4.9 | 4.8 |
| On 250 µm screen (%) | 10.2 | 1.6 | 0.8 | 1.2 | 1.2 |
| On 200 µm screen (%) | 5.3 | 0.3 | 0.1 | 0.4 | 0.1 |
| On 100 µm screen (%) | 2.5 | 0.1 | 0 | 0 | 0 |
| Thru 100 µm screen (%) | 0.1 | 0.1 | 0 | 0 | 0 |

S = Screened, U = Unscreened

The results shown in Table 1 indicate that it is possible to produce granule sizes varying over a considerable range, using spray granulation methods according to the invention. The product had noticeably better flow properties and less dusting than the neat feed material.

Example 2

Spray agglomeration of neat sucralose was performed on a Glatt GPCG-60 batch particle coater, using an 18" Wurster insert available from Glatt, using the process conditions shown in Table 2.

TABLE 2

| Run | Inlet Air Temp (° C.) | Bowl Charge (kg) | Final Batch Wt. (kg) | Wt. Sucralose Soln./conc. (kg/%) | Spray Rate (g/min) | Process Air Volume (cfm) | Atomizer Press. (bar) | Final Bulk Dens. (g/cc) | Total Process Time (min) |
|---|---|---|---|---|---|---|---|---|---|
| 7 | 60-91 | 20.0 | 55.0 | 100.0/35 | 300-900 | 900 | 2.0-2.5 | 0.84 | 179 |
| 8 | 50-91 | 20.0 | 70.0 | 143.0/35 | 350-900 | 900 | 2.0-2.5 | 0.88 | 196 |
| 9 | 60-99 | 20.0 | 70.0 | 143.0/35 | 500-1000 | 900 | 2.0-2.2 | 0.80 | 155 |

The results of these runs are shown below in Table 3.

TABLE 3

| | Granule Size in μm, % of Total | | | | | | |
|---|---|---|---|---|---|---|---|
| Run | >420 | 300-420 | 250-300 | 177-250 | 149-177 | 100-149 | 74-100 | <74 |
| 7 | 1.3 | 1.0 | 9.0 | 36.2 | 28.9 | 21.6 | 2.6 | 0.4 |
| 8 | 0.2 | 0.3 | 1.9 | 13.7 | 23.0 | 48.8 | 11.6 | 0.4 |
| 9 | 0.1 | 0.3 | 0.8 | 6.8 | 17.2 | 61.6 | 10.4 | 2.9 |

Example 3

Spray agglomeration of neat sucralose was performed on a Glatt GPCG-60 batch particle coater, using a top spray without a Wurster insert, using the process conditions shown in Table 4.

TABLE 4

| Run | Inlet Air Temp (° C.) | Bowl Charge (kg) | Final Batch Wt. (kg) | Wt. Sucralose Soln./conc. (kg/%) | Spray Rate (g/min) | Process Air Volume (cfm) | Atomizer Press. (bar) | Final Bulk Dens. (g/cc) | Total Process Time (min) |
|---|---|---|---|---|---|---|---|---|---|
| 10 | 60-86 | 100 | 144 | 120.0/35 | 1500-2500 | 1800 | 2.5 | N/A | 68 |
| 11 | 80-93 | 42 | 142 | 250.0/40 | 1500-2250 | 1800 | 2.5 down to 2.0 | 0.64 | 123 |
| 12 | 70-90 | 40 | 140 | 250.0/40 | 1500-2100 | 1800 | 4.0 | 0.74 | 120 |
| 13 | 70-83 | 40 | 140 | 250.0/40 | 1500-1900 | 1800 | 2.0 for 1 h, then 4.0 | 0.81 | 138 |

The results of these runs are shown below in Table 5.

TABLE 5

| | Granule Size in μm, % of Total | | | | | | |
|---|---|---|---|---|---|---|---|
| Run | >420 | 300-420 | 250-300 | 177-250 | 149-177 | 100-149 | 74-100 | <74 |
| 10 | | | Unable to Complete Run | | | | | |
| 11 | 0.9 | 0.8 | 4.7 | 32.7 | 40.5 | 10.5 | 2.3 | 7.7 |
| 12 | 0.3 | 0.4 | 0.4 | 2.3 | 9.3 | 60.5 | 22.7 | 4.0 |
| 13 | 0.4 | 0.5 | 3.2 | 28.7 | 38.0 | 22.3 | 5.6 | 1.4 |

Figure 1B:
Figure 2A:
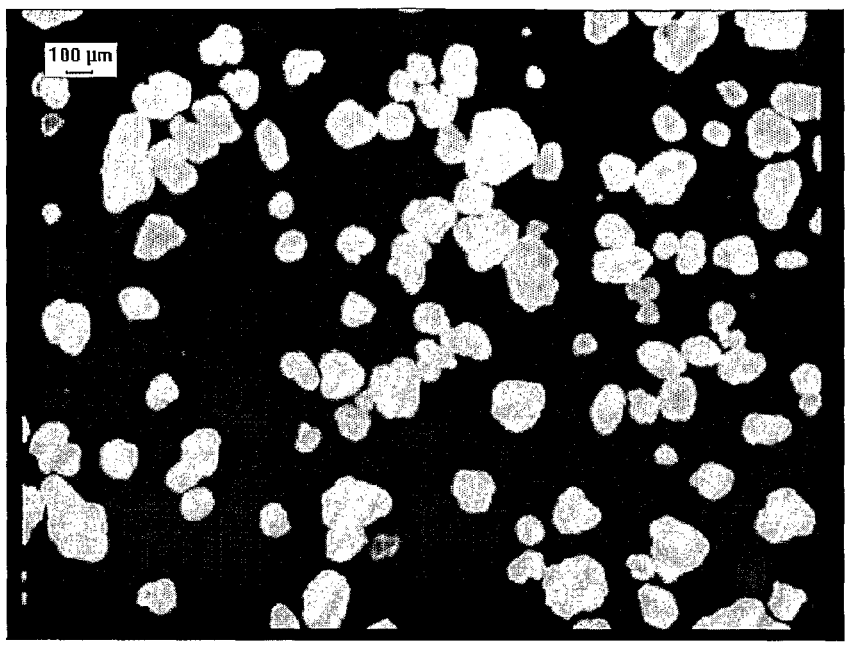
FIGS. 2a and 2b are photomicrographs of exemplary sucralose granules of this invention.
Figure 2B:
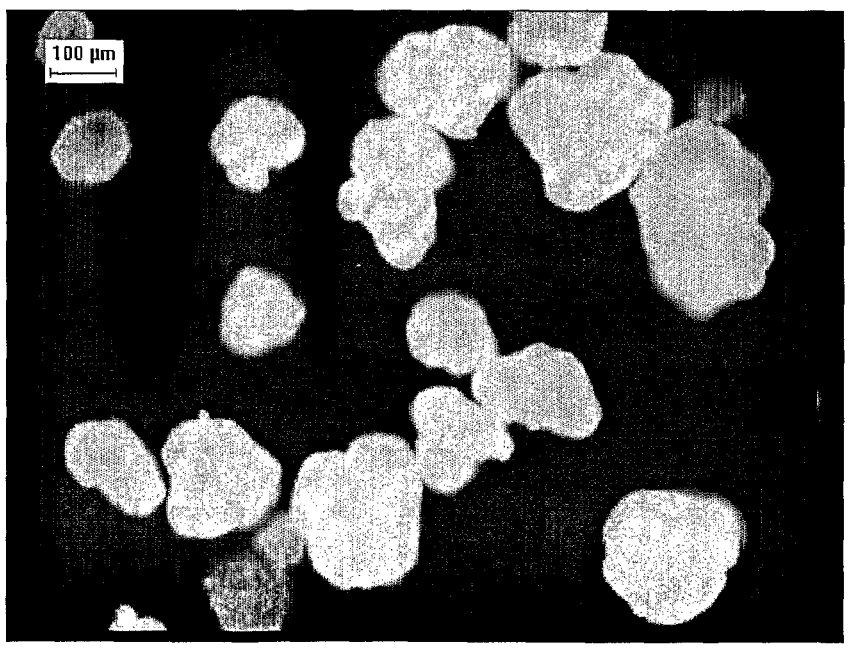
Figure 3A:
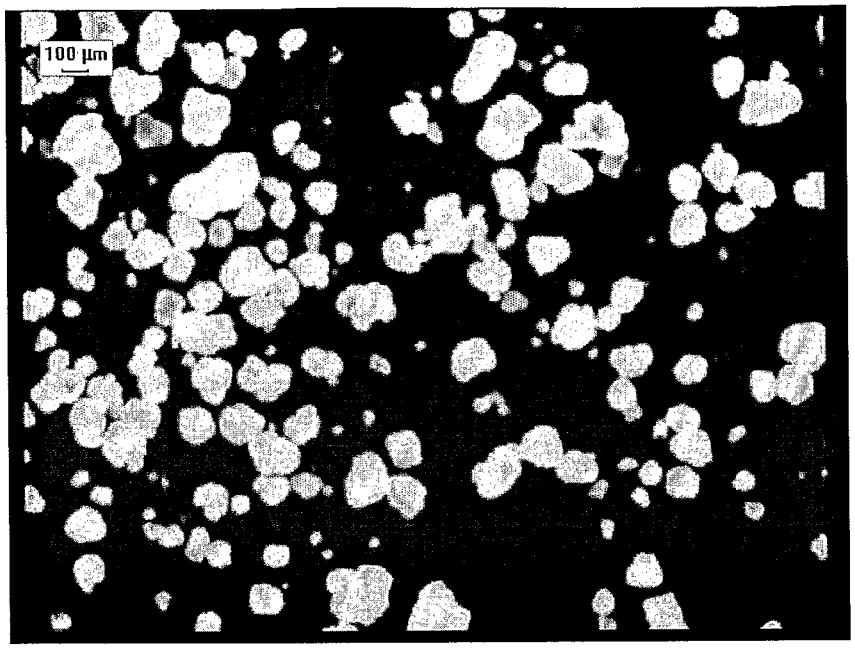
FIGS. 3a and 3b are photomicrographs of additional exemplary sucralose granules of this invention.
Figure 3B:
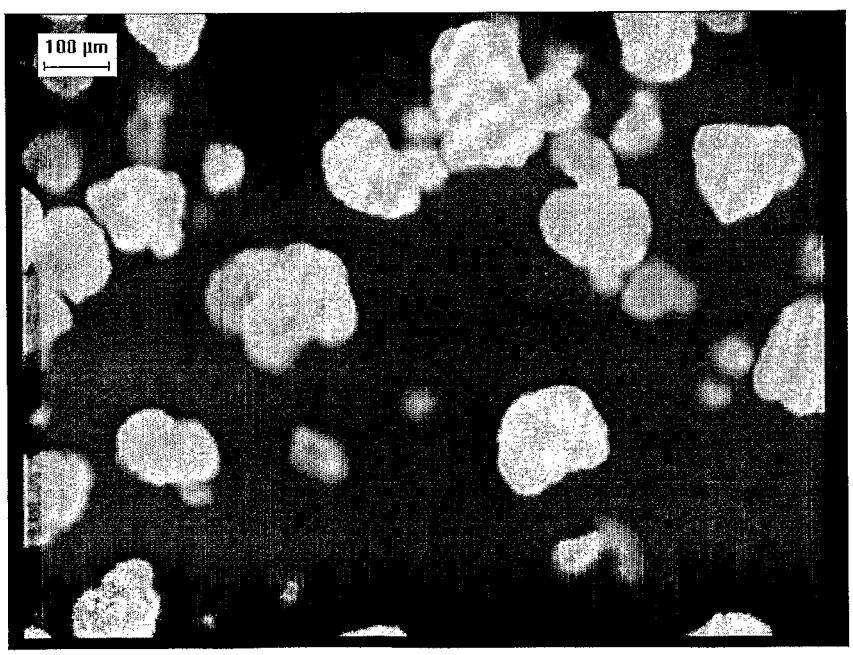

Surface micrographs were taken during processing, and these show the progression of growth. FIGS. 1a and 1b show the Example 2 starting material, which notably contains needles and fines, at different magnifications. FIGS. 2a and 2b show the final product from run 7 of Example 2, a Wurster batch run. It is seen that the needles are essentially absent. FIGS. 3a and 3b show the granules formed in run 13 of Example 3, a top spray batch. These represent agglomerates of the starting particles, which resembled those of FIG. 1, in which the agglomerates appear to have become coated with sucralose from the particle growth mixture. The result was granules having a relatively uniform size and rounded appearance, compared to the starting particles, and a rather smooth appearance due to the formation of a coating of sucralose on the surface.

Example 4

Agglomeration of neat sucralose was performed using a Glatt GPCG-1 lab-scale batch particle coater, using the processing conditions shown in Table 6, where the "solid component added" refers to neat sucralose. The neat sucralose had a $d_{50}$ value of about 85 μm, and a particle shape resembling that shown in FIG. 1. The properties of the granular sucralose product are shown in Tables 6 and 7.

TABLE 6

| | Test #1 | Test #2 | Test #3 | Test #4 | Test #5 |
|---|---|---|---|---|---|
| Spray Nozzle Location | Bottom | Bottom | Bottom | Bottom | Bottom |
| Solid Component Added (g) | 200 | 200 | 200 | 200 | 800 |
| Liquid Composition (% Sucralose) | 50 | 50 | 50 | 50 | 50 |
| Liquid Component Added (g) | 400 | 400 | 400 | 400 | 1600 |
| Moisture Content (%) | 0.09 | 0.2 | 0.27 | 0.11 | 0.11 |
| Loose Bulk Density (g/L) | 719 | 671 | 616 | 704 | 679 |

TABLE 6-continued

| Particle Size: | | Test #6 | Test #7 | Test #8 | Test #9 |
|---|---|---|---|---|---|
| | On 630 μm screen (%) | 0 | 0 | 0 | 0 |
| | On 500 μm screen (%) | 0.2 | 0 | 0 | 0.1 |
| | On 400 μm screen (%) | 0.2 | 0.3 | 0.2 | 0.3 |
| | On 315 μm screen (%) | 4.7 | 10.4 | 1.4 | 2.2 |
| | On 250 μm screen (%) | 23 | 46 | 1.3 | 34 |
| | On 125 μm screen (%) | 66.2 | 38 | 73.6 | 48.8 |
| | Thru 125 μm screen (%) | 0.6 | 1.4 | 16.5 | 14.4 |

| | | Test #6 | Test #7 | Test #8 | Test #9 | Test #10 |
|---|---|---|---|---|---|---|
| Spray Nozzle Location | | Bottom | Bottom | Bottom | Top | Top |
| Solid Component Added (g) | | 800 | 800 | 400 | 400 | 200 |
| Liquid Composition (% Sucralose) | | 50 | 50 | 35 | 50 | 50 |
| Liquid Component Added (g) | | 1600 | 1600 | 1142 | 800 | 200 |
| Moisture Content (%) | | 0.06 | 0.66 | 0.11 | 0.68 | 0.17 |
| Loose Bulk Density (g/L) | | 621 | 527 | 689 | 516 | 633 |
| Particle Size: | On 630 μm screen (%) | 0.7 | 2.6 | 0.6 | 1.2 | 5.7 |
| | On 500 μm screen (%) | 1 | 2.3 | 0.2 | 5 | 2.3 |
| | On 400 μm screen (%) | 2.2 | 4.5 | 0.3 | 9.5 | 2.4 |
| | On 315 μm screen (%) | 7.6 | 13.1 | 1.7 | 27.7 | 7.1 |
| | On 250 μm screen (%) | 35.2 | 39 | 15 | 29.1 | 9.4 |
| | On 125 μm screen (%) | 55.8 | 37.4 | 76.7 | 25 | 56.1 |
| | Thru 125 μm screen (%) | 5.1 | 0.9 | 5.7 | 2.1 | 12.8 |

Properties of selected samples from Table 6 are shown in Table 7.

TABLE 7

| Sample Identity | FRI | FDI | BDI | SBI | Mean Particle Size (μm) |
|---|---|---|---|---|---|
| test 2 | 2039 | 46.2 | 48 | 1.10% | 127 |
| test 3 | 3642 | 42.7 | 44.1 | 1.20% | 160 |
| test 8 | 4191 | 44.2 | 45.4 | 1.20% | 188 |
| test 9 | 4638 | 43.2 | 44.5 | 1.20% | 202 |
| test 7 | 7241 | 46.5 | 47.7 | 1.30% | 412 |

FRI—Flow Rate Index - Higher means better flow
FDI—Flow Density Index - similar to loose bulk density - lbs/ft³
BDI—Bin Density Index - similar to packed bulk density - lbs/ft³
SBI—Spring Back Index By comparison, the flow properties obtained with neat sucralose from typical production runs are shown below in Table 8.

TABLE 8

| Sample Identity | FRI | FDI | BDI | SBI | Mean Particle Size (μm) |
|---|---|---|---|---|---|
| Neat | 365 | 47.1 | 51.8 | 1.5% | 85 |

Example 5

Spray granulation of neat sucralose was performed using a Glatt AGT-150 lab-scale continuous particle coater, using the processing conditions shown in Table 9. The properties of the granular sucralose product are shown in Tables 9 and 10. Feed rates of the sucralose solution varied, but were typically at a rate that provided between about 40 and about 60 wt % of the sucralose exiting the system when solid sucralose was also being fed, and at a similar rate even when no solid was being added simultaneously.

TABLE 9

| | Test #1 | Test #2 | Test #3 | Test #4 | Test #5 |
|---|---|---|---|---|---|
| Spray Nozzle Location | Bottom | Bottom | Bottom | Bottom | Bottom |
| Solid Component Added (g/min) (neat sucralose) | 5-15 | 5-15 | 5-15 | 5-15 | 5-15 |
| Liquid Composition (% Sucralose) | 50 | 50 | 50 | 50 | 50 |
| Moisture Content (%) | 0.18 | 0.3 | 0.29 | 0.37 | 0.33 |
| Loose Bulk Density (g/L) | 631 | 611 | 661 | 730 | 789 |
| Particle Size: On 630 μm screen (%) | | | 5.4 | 4.7 | 5.5 |
| On 500 μm screen (%) | | | 26.7 | 27.6 | 40.5 |
| On 400 μm screen (%) | | | 38.6 | 41.6 | 41 |
| On 315 μm screen (%) | | | 22.7 | 21.5 | 11.7 |
| On 250 μm screen (%) | | | 4.8 | 3.4 | 1.3 |
| On 125 μm screen (%) | | | 2.4 | 1 | 0.5 |
| Thru 125 μm screen (%) | | | 1 | 0 | 0.1 |

| | Test #6 | Test #7 | Test #8 | Test #9 |
|---|---|---|---|---|
| Spray Nozzle Location | Bottom | Bottom | Bottom | Bottom |
| Solid Component Added (g/min) (neat sucralose) | 5-15 | 5-15 | 5-15 | 5-15 |
| Liquid Composition (% Sucralose) | 50 | 50 | 50 | 50 |
| Moisture Content (%) | 0.31 | 0.32 | 0.18 | 0.19 |
| Loose Bulk Density (g/L) | 806 | 828 | 837 | 851 |
| Particle Size: On 630 μm screen (%) | 7.9 | | 12.7 | 23.8 |
| On 500 μm screen (%) | 52.3 | | 62.8 | 46.8 |

TABLE 9-continued

| | | Test #6 | Test #8 | Test #9 |
|---|---|---|---|---|
| On 400 μm screen (%) | | 32.1 | 21.1 | 13.4 |
| On 315 μm screen (%) | | 6.5 | 2.8 | 4.3 |
| On 250 μm screen (%) | | 1 | 0.2 | 2.9 |
| On 125 μm screen (%) | | 0.4 | 0.1 | 7.2 |
| Thru 125 μm screen (%) | | 0 | 0.1 | 1.6 |

| | Test #10 | Test #11 | Test #12 | Test #13 |
|---|---|---|---|---|
| Spray Nozzle Location | Bottom | Bottom | Bottom | Bottom |
| Solid Component Added (g/min) (neat sucralose) | 5-15 | none | none | none |
| Liquid Composition (% Sucralose) | 50 | 50 | 50 | 50 |
| Moisture Content (%) | 0.18 | 0.29 | 0.31 | 0.38 |
| Loose Bulk Density (g/L) | 740 | 700 | 689 | 658 |
| Particle Size: On 630 μm screen (%) | 45.2 | 22.3 | 7.8 | 2.8 |
| On 500 μm screen (%) | 44.7 | 35.4 | 16.3 | 8 |
| On 400 μm screen (%) | 9.1 | 18.5 | 17.2 | 15.5 |
| On 315 μm screen (%) | 1 | 9.9 | 20.4 | 31.2 |
| On 250 μm screen (%) | 0.1 | 5.7 | 17.5 | 22.8 |
| On 125 μm screen (%) | 0.1 | 7.8 | 19.2 | 18.1 |
| Thru 125 μm screen (%) | 0.3 | 0.8 | 1.3 | 1.8 |

| | Test #14 | Test #15 | Test #16 | Test #17 |
|---|---|---|---|---|
| Spray Nozzle Location | Bottom | Bottom | Bottom | Bottom |
| Solid Component Added (g/min) (neat sucralose) | none | none | none | none |
| Liquid Composition (% Sucralose) | 50 | 50 | 50 | 50 |
| Moisture Content (%) | 0.36 | 0.47 | 0.37 | 0.29 |
| Loose Bulk Density (g/L) | 635 | 621 | 665 | 720 |
| Particle Size: On 630 μm screen (%) | 1 | 2.4 | 21.2 | 10.3 |
| On 500 μm screen (%) | 8.8 | 15.2 | 45.6 | 50.6 |
| On 400 μm screen (%) | 27.5 | 31.8 | 24.7 | 33.5 |
| On 315 μm screen (%) | 36 | 31.5 | 6.4 | 4.4 |
| On 250 μm screen (%) | 14.4 | 11.9 | 1.4 | 0.3 |
| On 125 μm screen (%) | 11.7 | 6.6 | 0.8 | 0 |
| Thru 125 μm screen (%) | 0.8 | 1 | 0.8 | 0.4 |

Properties of selected samples from Table 9 are shown in Table 10.

TABLE 10

| Sample Identity | FRI | FDI | BDI | SBI | Mean Particle Size (μm) |
|---|---|---|---|---|---|
| test 4 | 10233 | 51.6 | 52.7 | 1.20% | 475 |
| test 6 | 11072 | 53.4 | 54.6 | 1.30% | 573 |
| test 11 | 9144 | 48 | 50 | 1.20% | 532 |
| test 12 | 7676 | 48.3 | 49.6 | 1.20% | 458 |
| test 13 | 6970 | 46.2 | 47.4 | 1.10% | 378 |
| test 14 | 6586 | 45.5 | 46.9 | 1.20% | 354 |
| test 15 | 7576 | 45.6 | 46.8 | 1.10% | 375 |
| test 16 | 9408 | 44.9 | 45.8 | 1.10% | 550 |

As can be seen, product having very good flow properties can be made according to the invention, as indicated by the very high FR1 values.

Example 6

Figure 4A:
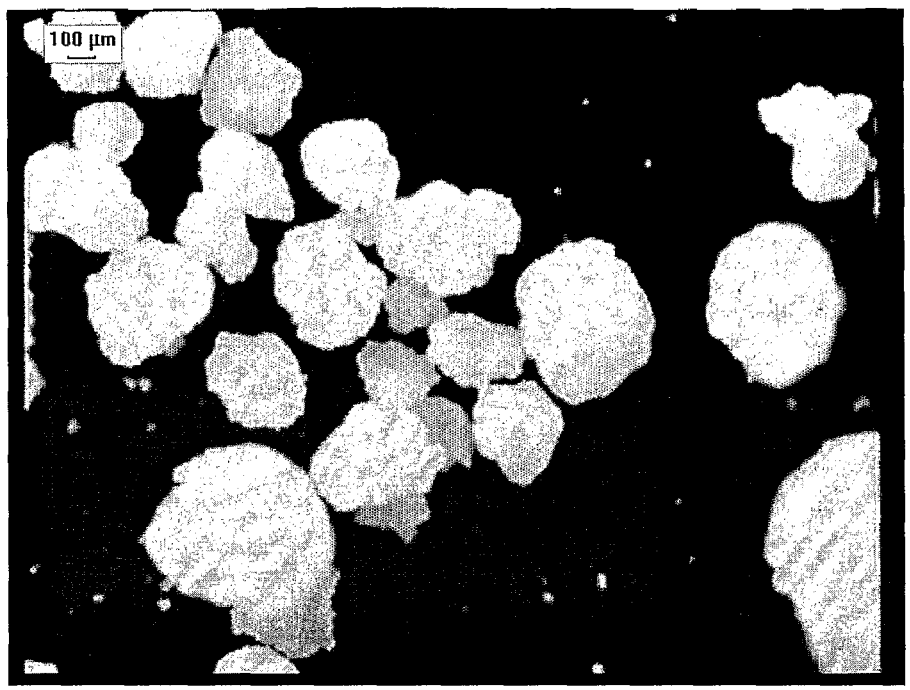
FIGS. 4a and 4b are photomicrographs of further examples of sucralose granules of this invention.
Figure 4B:
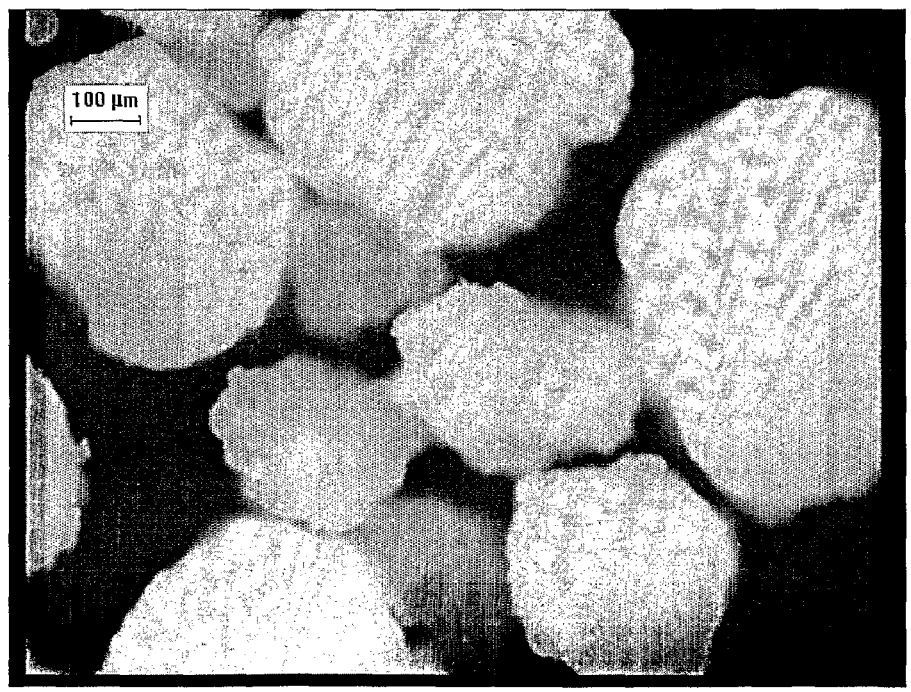

Spray agglomeration and/or granulation of neat sucralose was performed using a Glatt GFG-20 pilot-scale continuous particle coater, using the processing conditions shown in Tables 11 and 12. The run began with about 15 kg of neat sucralose as a start-up charge. The properties of the granular sucralose product are shown in Tables 11, 12, and 13. FIGS. 4a and 4b are photomicrographs at two different magnifications of test 7 product in Table 11.

TABLE 11

| | Test #1 | Test #2 | Test #3 | Test #4 | Test #5 |
|---|---|---|---|---|---|
| Spray Nozzle Location | Bottom | Bottom | Bottom | Bottom | Bottom |
| Solid Component (neat sucralose) added? | no | no | yes | yes | yes |
| Liquid Composition (% Sucralose) | 50% | 50% | 50% | 50% | 50% |
| Liquid Component Spray Rate (kg/h) | 19-27 | 19-27 | 27-20 | 27-20 | 27-20 |
| Moisture Content (%) | 0.1 | 0.22 | 0.14 | 0.24 | 0.25 |
| Loose Bulk Density (g/L) | 700 | 749 | 772 | 768 | 803 |
| Particle Size: On 630 μm screen (%) | 0.7 | 0.6 | 2.7 | 5.4 | 24.5 |
| On 500 μm screen (%) | 0.3 | 0.5 | 4.4 | 14.9 | 32.1 |
| On 400 μm screen (%) | 0.7 | 1.4 | 11.6 | 25.9 | 24.6 |
| On 315 μm screen (%) | 2.7 | 7.6 | 28.9 | 30.3 | 13.4 |
| On 250 μm screen (%) | 8.9 | 16.6 | 27 | 15.2 | 3 |
| On 125 μm screen (%) | 71.1 | 65.4 | 23.6 | 7.3 | 1.4 |
| Thru 125 μm screen (%) | 13.4 | 7.1 | 0.9 | 0.6 | 0.2 |

| | Test #6 | Test #7 | Test #8 | Test #9 | Test #10 |
|---|---|---|---|---|---|
| Spray Nozzle Location | Bottom | Bottom | Bottom | Bottom | Bottom |
| Solid Component (neat sucralose) added? | yes | yes | no | no | no |

TABLE 11-continued

| | | | | | | |
|---|---|---|---|---|---|---|
| Liquid Composition (% Sucralose) | | 50% | 50% | 50% | 50% | 50% |
| Liquid Component Spray Rate (kg/h) | | 27-20 | 27-20 | 27-20 | 27-20 | 27-20 |
| Moisture Content (%) | | 0.21 | 0.29 | 0.33 | 0.2 | 0.18 |
| Loose Bulk Density (g/L) | | 813 | 805 | 820 | 835 | 838 |
| Particle Size: | On 630 μm screen (%) | 29 | 34.9 | 46.5 | 53.8 | 59.9 |
| | On 500 μm screen (%) | 23.4 | 17.3 | 19.4 | 22.8 | 24.2 |
| | On 400 μm screen (%) | 14.7 | 13 | 17.4 | 14.8 | 10.4 |
| | On 315 μm screen (%) | 10.9 | 17.4 | 11.8 | 5.9 | 3.3 |
| | On 250 μm screen (%) | 7.7 | 9.6 | 2.6 | 1.1 | 0.9 |
| | On 125 μm screen (%) | 9 | 4.3 | 1.4 | 0.7 | 0.9 |
| | Thru 125 μm screen (%) | 0.2 | 0.3 | 0.3 | 0.3 | 0.2 |

TABLE 12

| | | Test #3.1 | Test #3.2 | Test #3.3 | Test #3.4 | Test #3.5 |
|---|---|---|---|---|---|---|
| Spray Nozzle Location | | Bottom | Bottom | Bottom | Bottom | Bottom |
| Solid Component (neat sucralose) Addn. Rate (kg/h) | | 8.4-10.7 | 8.4-10.7 | 8.4-10.7 | 8.4-10.7 | 8.4-10.7 |
| Liquid Composition (% Sucralose) | | 50% | 50% | 50% | 50% | 50% |
| Liquid Component Spray Rate (kg/h) | | 20.0-23.5 | 20.0-23.5 | 20.0-23.5 | 20.0-23.5 | 20.0-23.5 |
| Moisture Content (%) | | 0.17 | 0.14 | 0.16 | 0.19 | 0.19 |
| Loose Bulk Density (g/L) | | 742 | 706 | 644 | 639 | 698 |
| Particle Size: | On 630 μm screen (%) | 60.9 | 32.2 | 15 | 12.6 | 22.7 |
| | On 500 μm screen (%) | 10.3 | 8.5 | 10.8 | 14 | 17 |
| | On 400 μm screen (%) | 6.3 | 8.5 | 15.6 | 19.7 | 13.5 |
| | On 315 μm screen (%) | 6.7 | 12.6 | 27.8 | 28.5 | 13.9 |
| | On 250 μm screen (%) | 4.9 | 11.3 | 14.7 | 10.4 | 8.1 |
| | On 125 μm screen (%) | 5.5 | 19.1 | 13.3 | 9 | 12.1 |
| | Thru 125 μm screen (%) | 0.5 | 0.4 | 2.3 | 1.1 | 1.6 |

| | | Test #5.1 | Test #5.2 | Test #5.3 | Test #5.4 | Test #6.1 |
|---|---|---|---|---|---|---|
| Spray Nozzle Location | | Bottom | Bottom | Bottom | Bottom | Bottom |
| Solid Component (neat sucralose) Addn. Rate (kg/h) | | 9.6-7.0 | 9.6-7.0 | 9.6-7.0 | 9.6-7.0 | 8.3-10.2 |
| Liquid Composition (% Sucralose) | | 50% | 50% | 50% | 50% | 50% |
| Liquid Component Spray Rate (kg/h) | | 22-28 | 22-28 | 22-28 | 22-28 | 13.2-17.0 |
| Moisture Content (%) | | 0.15 | 0.1 | 0.12 | 0.1 | 0.48 |
| Loose Bulk Density (g/L) | | 655 | 651 | 643 | 640 | 519 |
| Particle Size: | On 630 μm screen (%) | 8.1 | 5.3 | 6.9 | 17.3 | 2.4 |
| | On 500 μm screen (%) | 13.8 | 8.8 | 10.5 | 24.9 | 18.5 |
| | On 400 μm screen (%) | 20.5 | 13.7 | 17.7 | 25.1 | 37.5 |
| | On 315 μm screen (%) | 26.8 | 25.6 | 25 | 16.6 | 32.1 |
| | On 250 μm screen (%) | 11.6 | 21.5 | 18 | 6.6 | 2.6 |
| | On 125 μm screen (%) | 15.2 | 26.2 | 19.7 | 7.1 | 2.8 |
| | Thru 125 μm screen (%) | 2.4 | 2 | 2.3 | 2.3 | 2.4 |

Properties of selected samples from Tables 11 and 12 are shown in Table 13.

TABLE 13

| Sample Identity | FRI | FDI | BDI | SBI | Mean Particle Size (μm) |
|---|---|---|---|---|---|
| 3.1 | 9849 | 47.2 | 48.7 | 1.20% | 811 |
| 3.4 | 7690 | 41.8 | 43 | 1.10% | 408 |
| 5.2 | 6514 | 44.9 | 46.1 | 1.20% | 313 |
| 5.4 | 8267 | 47.3 | 48.5 | 1.20% | 579 |
| 6.1 | 5959 | 35.4 | 36.4 | 1.10% | 213 |

The flow properties of agglomerated/spray granulated sucralose are very good compared to other dry forms of sucralose such as neat or micronized. Table 14 summarizes the flow properties by comparing the angle of repose for selected samples.

TABLE 14

| Sample Name | | AOR 1 | AOR 2 | AOR 3 | Mean |
|---|---|---|---|---|---|
| Agglomerated (syrup) | PM050007 | 28 | 28 | 29 | 28 |
| Agglomerated (syrup) | PM050013 | 27 | 25 | 27 | 26 |
| Micronized (as-is) | Toll | 39 | 37 | 35 | 37 |
| Neat (as-is) | H2804B3NTA | 35 | 36 | 36 | 36 |
| Micronized (Screened) | Toll | 45 | 42 | 45 | 44 |
| Agglomerated (water) | 6919-008 | 43 | 45 | 49 | 46 |
| Neat (screened) | 6919-008 Feed | 45 | 47 | 47 | 46 |
| Agglomerated (syrup) | 200-04/267 test 1 | 27 | 28 | 28 | 28 |
| Agglomerated (syrup) | 200-04/267 test 2 | 31 | 32 | 30 | 31 |
| Agglomerated (syrup) | 200-04/267 test 6 | 29 | 30 | 31 | 30 |
| Agglomerated (syrup) | 200-04/267 test 9 | 26 | 32 | 32 | 30 |
| Neat (screened) | H2804B3NTA | 38.25 | 38.27 | 37.62 | 38.05 |
| Agglomerated (water) | 6919-010 | 32.71 | 30.51 | 31.49 | 31.57 |
| Agglomerated (syrup) | 6839-063B | 30 | 32 | 32 | 31.33 |
| Agglomerated (syrup) | 6839-064A | 29 | 29 | 29 | 29.00 |
| Agglomerated (syrup) | 6839-067 | 38 | 41 | 39 | 39.33 |
| Agglomerated (syrup) | 6839-068C | 31 | 32 | 29 | 30.67 |
| Agglomerated (syrup) | 6839-069 | 33 | 33 | 30 | 32.00 |
| Agglomerated (syrup) | 6839-078 | 28 | 29 | 28 | 28.33 |
| Agglomerated (syrup) | 6839-082 | 30 | 31 | 31 | 30.67 |
| Agglomerated (syrup) | 6839-083A | 36 | 33 | 40 | 36.33 |
| Agglomerated (syrup) | 6839-115 | 28 | 27 | 29 | 28.00 |
| Agglomerated (syrup) | 6839-117 | 32 | 30 | 29 | 30.33 |
| Agglomerated (syrup) | 6839-122 | 31 | 31 | 31 | 31.00 |
| Agglomerated (syrup) | 6839-126A | 42 | 38 | 38 | 39.33 |
| Agglomerated (syrup) | 6839-126B | 28 | 26 | 28 | 27.33 |
| Agglomerated (syrup) | 6717-141 | 28 | 28 | 29 | 28.33 |

The PM050007 and PM050013 samples are those reported in Table 2 (run 7) and Table 4 (run 13), respectively. Sample 6919-008 was micronized sucralose that had subsequently been subjected to a crystal redefinition process according to the methods described in U.S. Pat. No. 5,932,720 to Sankey, and sample 6919-010 was neat sucralose that had been similarly treated. The product noted as "screened" was a commercial micronized sucralose, screened to remove large clumps.

The 6839 and 6717 series runs all represent neat sucralose that had been agglomerated using a Glatt GPGC-1 unit with 10-50% aqueous sucralose being sprayed from the top, in a manner similar to the runs of Example 4. FIGS. 5a and 5b are photomicrographs of sample 6839-082 from Table 14, shown at two different magnifications. The granules have formed by agglomeration of starting particles, which are still visible, with a relatively small amount of particle growth mixture. The granules are relatively large, and have an open structure with a large amount of exposed surface area. Due to this large surface area, such granules would be expected to be very rapidly soluble during formulation into a sweetened product, and thus would be very desirable in commercial use. Despite this, however, they would still be expected to produce very little dusting, an added advantage.

The coefficient of variation of the particle size distribution can be used as an indication of the narrowness or breadth of the distribution. A large coefficient of variation indicates a broad distribution of particle sizes within the sample, and a small coefficient of variation indicates a narrow distribution. Table 15 summarizes the coefficient of variation (given in %) and mean particle size for various sucralose samples.

TABLE 15

| Sample | C.V. | Mean Particle Size (microns) |
| --- | --- | --- |
| Neat Sucralose | 57.76 | 83.81 |
| Micronized Sucralose | 78.07 | 4.05 |
| Sucralose/Water | 52.76 | 90.41 |
| Wurster coated Sucralose | 32.44 | 180.55 |
| Top Spray Agglomerated Sucralose | 31.38 | 172.14 |

The entry marked "Sucralose/Water" is sample 6919-10 from Table 14. The "Wurster Coated Sucralose" sample is from run 7 of Example 2, and the "Top Spray Agglomerated Sucralose" sample is run 13 from Example 3.

As can be seen, the flow properties of sucralose particles can be greatly affected by agglomeration and coating. The methods discussed in this application can produce sucralose particles with a very narrow particle size distribution and very good flow properties as shown by the angle of repose and coefficient of variation.

Although the invention is illustrated and described herein with reference to specific embodiments, it is not intended that the subjoined claims be limited to the details shown. Rather, it is expected that various modifications may be made in these details by those skilled in the art, which modifications may still be within the spirit and scope of the claimed subject matter and it is intended that these claims be construed accordingly.

What is claimed:

1. Granules consisting of sucralose and a buffer, each of said granules having an outer surface region thereof consisting of solution-coated sucralose and a buffer, and each of said granules consisting of one or more starting sucralose particles and said outer surface region, wherein said outer surface region resides on the one or more starting sucralose particles, said starting sucralose particles optionally including a buffer.

2. The granules of claim 1, wherein each of the granules consists of a plurality of the starting sucralose particles and said outer surface region, and wherein the outer surface region consisting of solution-coated sucralose and a buffer bridges the starting sucralose particles, thereby adhering them together and forming the granules.

3. The granules of claim 1, wherein a portion of the granules cannot pass through a 25-μm screen, said portion having a number average length to diameter ratio of at most 2.0 and constituting at least 99 wt % of the granules.

4. The granules of claim 1, wherein the granules have a d50 between 800 and 2000 μm.

5. The granules of claim 1, wherein the granules have a d50 between 400 and 800 μm.

6. The granules of claim 1, wherein the granules have a d50 between 100 and 300 μm.

7. The granules of claim 1, wherein the granules have a moisture content between 0.05 and 1.0 wt %.

8. The granules of claim 1, wherein the granules have a moisture content between 0.1 and 0.5 wt %.

9. The granules of claim 1, wherein the granules have an angle of repose between 20° and 50°.

10. The granules of claim 1, wherein the granules have a bulk density between 400 and 900 g/L.

11. The granules of claim 1, wherein the granules have a bulk density between 600 and 900 g/L.

12. The granules of claim 1, wherein the granules have a coefficient of variation less than 35%.

13. The granules of claim 1, wherein the granules have a bulk density between 750 and 850 g/L, a d50 value between 100 and 300 μm, and an angle of repose from 25° to 35°.

14. A method of preparing granules consisting of sucralose and a buffer, the method comprising:
   a) fluidizing starting particles consisting of sucralose and optionally a buffer on a fluidized bed; and
   b) applying to the starting particles an aqueous particle growth mixture consisting of water, dissolved sucralose, a buffer and optionally undissolved sucralose to produce wet particles consisting of solid sucralose and optionally a buffer with a layer of aqueous sucralose and buffer thereon, while simultaneously drying the wet particles;
   wherein steps a) and b) are repeated as required such that between 5 and 100% of a total weight of sucralose in the granules is provided by the aqueous particle growth mixture, and wherein the aqueous particle growth mixture has a pH in a range of 4.0 to 7.0.

15. The method of claim 14, wherein steps a) and b) are repeated such that the granules produced thereby have a d50 value between 800 and 2000 μm.

16. The method of claim 14, wherein steps a) and b) are repeated such that the granules produced thereby have a d50 value between 400 and 800 μm.

17. The method of claim 14, wherein steps a) and b) are repeated such that the granules produced thereby have a d50 value between 100 and 300 μm.

18. The method of claim 14, wherein the dissolved sucralose constitutes substantially all of the sucralose in the aqueous particle growth mixture.

19. The method of claim 14, wherein the fluidized bed is a continuous moving bed.

20. The method of claim 14, wherein the operating temperature of the fluidized bed is between 15 and 40° C.

21. The method of claim 14, wherein the dissolved sucralose constitutes between 0.1 and 65 wt % of the aqueous particle growth mixture.

22. The method of claim 14, wherein the dissolved sucralose constitutes between 5 and 65 wt % of the aqueous particle growth mixture.

23. The method of claim 14, wherein the dissolved sucralose constitutes between 20 and 55 wt % of the aqueous particle growth mixture.

24. The method of claim 14, wherein between 25 and 50% of a total weight of sucralose in the granules is provided by the aqueous particle growth mixture.

25. The method of claim 14, wherein at least 90% of a total weight of sucralose in the granules is provided by the aqueous particle growth mixture.

26. The method of claim 14, wherein the method is a continuous preparation method in which step a) is performed only once at the beginning thereof, and step b) is performed continuously thereafter.

27. The method of claim 14, wherein the aqueous particle growth mixture comprises a buffer and has a pH in a range of 4.0 to 7.0.

28. The method of claim 14, wherein the pH is in a range of 4.2 to 5.0.

29. The method of claim 14, wherein the pH is in a range of 4.2 to 4.6.

30. The method of claim 14, wherein the buffer comprises from 0.05 to 2.0 wt % of a combination of a weak acid a salt of a weak acid.

31. The method of claim 14, wherein the buffer comprises from 0.1 to 1.0 wt % of a combination of a weak acid a salt of a weak acid.

32. The method of claim 14, wherein the buffer comprises citric acid and sodium citrate.

33. The granules of claim 1, wherein the granules have a bulk density between 750 and 850 g/L.

* * * * *